(12) United States Patent
Lu et al.

(10) Patent No.: US 12,274,933 B2
(45) Date of Patent: Apr. 15, 2025

(54) GAME CONTROLLER

(71) Applicant: DEXIN CORPORATION, New Taipei (TW)

(72) Inventors: Ho-Lung Lu, New Taipei (TW); Min-Chien Chang, New Taipei (TW)

(73) Assignee: DEXIN CORPORATION, New Taipei (TW)

( * ) Notice: Subject to any disclaimer, the term of this patent is extended or adjusted under 35 U.S.C. 154(b) by 431 days.

(21) Appl. No.: 17/972,573

(22) Filed: Oct. 24, 2022

(65) Prior Publication Data
US 2023/0390634 A1    Dec. 7, 2023

(30) Foreign Application Priority Data
Jun. 1, 2022   (TW) .................................. 111120347

(51) Int. Cl.
*A63F 13/24* (2014.01)
*A63F 13/23* (2014.01)

(52) U.S. Cl.
CPC ............. *A63F 13/24* (2014.09); *A63F 13/23* (2014.09); *A63F 2300/1025* (2013.01); *A63F 2300/1043* (2013.01)

(58) Field of Classification Search
CPC .. A63F 13/24; A63F 13/23; A63F 2300/1025; A63F 2300/1043; A63F 13/98; A63F 13/235; A63F 13/245; A63F 2300/1031; A63F 2300/1062
See application file for complete search history.

(56) References Cited

U.S. PATENT DOCUMENTS

| | | | | |
|---|---|---|---|---|
| 5,046,739 A | * | 9/1991 | Reichow | A63F 13/02 273/148 B |
| 6,512,511 B2 | * | 1/2003 | Willner | A63F 13/24 348/E5.103 |
| 6,530,838 B2 | * | 3/2003 | Ha | A63F 13/24 345/169 |
| 6,811,491 B1 | * | 11/2004 | Levenberg | A63F 13/22 463/47 |
| 7,833,097 B1 | * | 11/2010 | Maddox | A63F 13/23 463/47 |
| 8,882,596 B2 | * | 11/2014 | Shimamura | A63F 13/211 463/37 |

(Continued)

*Primary Examiner* — Omkar A Deodhar
*Assistant Examiner* — Matthew D Hoel
(74) *Attorney, Agent, or Firm* — Li & Cai Intellectual Property Office

(57) ABSTRACT

A game controller is provided. The game controller includes a first handle body, a second handle body, a first support module, and a second support module. The first support module includes a first support groove, a first clamping member, and a second clamping member. The first clamping member and the second clamping member are disposed at two sides of the first support module. The second support module includes a second support groove, a third clamping member, and a fourth clamping member. The third clamping member and the fourth clamping member are disposed at two sides of the second support module. A mobile device is disposed between the first support module, the first clamping member and the second clamping member of the first support module, the second support module, and the third clamping member and the fourth clamping member of the second support module.

10 Claims, 9 Drawing Sheets

(56) References Cited

U.S. PATENT DOCUMENTS

| | | | |
|---|---|---|---|
| 8,972,617 B2* | 3/2015 | Hirschman | G06F 3/023 |
| | | | 463/37 |
| 9,317,181 B2* | 4/2016 | Sizelove | A63F 13/40 |
| 9,895,606 B1* | 2/2018 | Kamata | A63F 13/235 |
| 10,888,770 B2* | 1/2021 | Onozawa | A63F 13/98 |
| 11,325,027 B1* | 5/2022 | Lu | A63F 13/98 |
| 11,344,809 B2* | 5/2022 | Kando | G06F 3/04842 |
| D1,021,886 S* | 4/2024 | Tong | D14/401 |
| 2006/0237209 A1* | 10/2006 | Horinouchi | G06F 1/1677 |
| | | | 174/50 |
| 2006/0286943 A1* | 12/2006 | Vance | A63F 13/98 |
| | | | 455/90.1 |
| 2008/0153593 A1* | 6/2008 | Ikeda | A63F 13/98 |
| | | | 463/37 |
| 2009/0111508 A1* | 4/2009 | Yeh | H04M 1/0256 |
| | | | 455/575.8 |
| 2010/0195279 A1* | 8/2010 | Michael | G06F 1/1632 |
| | | | 361/679.41 |
| 2012/0040758 A1* | 2/2012 | Hovseth | A63F 13/245 |
| | | | 463/37 |
| 2012/0088582 A1* | 4/2012 | Wu | A63F 13/5255 |
| | | | 463/37 |
| 2013/0058659 A1* | 3/2013 | Umezu | A63F 13/235 |
| | | | 398/128 |
| 2013/0157764 A1* | 6/2013 | Joynes | A63F 13/23 |
| | | | 463/37 |
| 2013/0341214 A1* | 12/2013 | King | A63F 13/98 |
| | | | 206/216 |
| 2014/0206451 A1* | 7/2014 | Helmes | G06F 1/1632 |
| | | | 463/39 |
| 2014/0221098 A1* | 8/2014 | Boulanger | G06F 1/1684 |
| | | | 361/679.3 |
| 2014/0274394 A1* | 9/2014 | Willis | G06F 1/1626 |
| | | | 463/37 |
| 2015/0018101 A1* | 1/2015 | Schoenith | A63F 13/98 |
| | | | 463/37 |
| 2015/0273325 A1* | 10/2015 | Falc | A63F 13/24 |
| | | | 463/37 |
| 2015/0281422 A1* | 10/2015 | Kessler | H04M 11/007 |
| | | | 455/557 |
| 2016/0107082 A1* | 4/2016 | Song | A63F 13/98 |
| | | | 463/37 |
| 2016/0231773 A1* | 8/2016 | Inoue | G06F 1/1686 |
| 2016/0361632 A1* | 12/2016 | Fujita | A63F 13/23 |
| 2016/0361641 A1* | 12/2016 | Koizumi | A63F 13/24 |
| 2018/0250588 A1* | 9/2018 | Winick | A63F 13/24 |
| 2021/0299553 A1* | 9/2021 | Lu | G06F 1/1632 |
| 2022/0080300 A1* | 3/2022 | Lu | A63F 13/24 |
| 2023/0105244 A1* | 4/2023 | Lu | A63F 13/24 |
| | | | 463/37 |
| 2023/0105605 A1* | 4/2023 | Lu | A63F 13/24 |
| | | | 463/37 |
| 2023/0256331 A1* | 8/2023 | Lu | A63F 13/98 |
| | | | 463/37 |
| 2023/0390634 A1* | 12/2023 | Lu | A63F 13/24 |
| 2024/0066392 A1* | 2/2024 | Lu | A63F 13/24 |
| 2024/0082700 A1* | 3/2024 | Lu | A63F 13/92 |
| 2024/0165502 A1* | 5/2024 | Lu | A63F 13/92 |
| 2024/0165503 A1* | 5/2024 | Lu | A63F 13/24 |

\* cited by examiner

GAME CONTROLLER

CROSS-REFERENCE TO RELATED PATENT APPLICATION

This application claims the benefit of priority to Taiwan Patent Application No. 111120347, filed on Jun. 1, 2022. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a game controller, and more particularly to a game controller that allows a simple assembling.

BACKGROUND OF THE DISCLOSURE

Conventionally, game controllers are matched with mobile devices via a handle body to improve user experience. However, mobile devices on the market are all in different sizes, especially in terms of aspect ratios. Therefore, how to enable the game controller to provide proper support to the mobile device is yet a problem to be addressed in the industry.

SUMMARY OF THE DISCLOSURE

In response to the above-referenced technical inadequacies, the present disclosure provides a game controller.

In one aspect, the present disclosure provides a game controller. The game controller includes a first handle body, a first support module, a second handle body, and a second support module. The first handle body includes a first control module, a first operation interface, a first connection portion, a second connection portion, and a first casing. The first support module includes a first support groove, a first support connection portion, a second support connection portion, a third support connection portion, a first clamping member, and a second clamping member. The second handle body includes a second control module, a second operation interface, and a second casing. The second support module includes a second support groove, a fourth support connection portion, a third clamping member, and a fourth clamping member. The first operation interface is electrically connected to the first control module. The first connection portion is electrically connected to the first operation interface. The second connection portion is electrically connected to the first control module. The first control module is disposed in the first casing. The first operation interface is disposed at a first side of the first casing, and the first connection portion is disposed at a second side of the first casing. The first casing has a first handle groove formed at the second side of the first casing, and the first connection portion is disposed in the first handle groove. The first support module is engaged to the first handle groove of the first casing via the first support groove. The first support connection portion is electrically connected to the first connection portion. The first support connection portion is electrically connected to the second support connection portion through the first operation interface. The second support connection portion is configured to be connected to a mobile device. The third support connection portion is connected to the second support connection portion. The first clamping member is disposed at one side of the first support module. The second clamping member is disposed at another side of the first support module. The second clamping member and the first clamping member are disposed opposite to each other. The second operation interface is electrically connected to the second control module. The second control module is disposed in the second casing. The second operation interface is disposed at a first side of the second casing. The second casing has a second handle groove formed at a second side of the second casing. The second support module is engaged to the second handle groove of the second casing via the second support groove. The second support module and the second casing are engaged to each other. The fourth support connection portion is electrically connected to a third connection portion. The third clamping member is disposed at one side of the second support module. The fourth clamping member is disposed at another side of the second support module. The third clamping member and the fourth clamping member are disposed opposite to each other.

In another aspect, the present disclosure provides a game controller. The game controller is configured to support a mobile device. The game controller includes a first handle body, a second handle body, a first support module, and a second support module. The first handle body includes a first handle groove. The second handle body includes a second handle groove. The first support module includes a first support groove, a first clamping member, and a second clamping member. The first handle body has a first handle groove. The second handle body has a second handle groove. The first support module is connected to the first handle groove of the first handle body through the first support groove. The first clamping member is extendably disposed in the first support module; and a second clamping member is extendably disposed in the first support module. The first clamping member and the second clamping member are disposed at two opposite sides of the first support module. The second support module is connected to the second handle groove of the second handle body through the second support groove. The third clamping member is extendably disposed in the second support module. The fourth clamping member is extendably disposed in the second support module. The third clamping member and the fourth clamping member are disposed at two opposite sides of the second support module. The mobile device is disposed between the first handle body, the first support module, the first clamping member and the second clamping member of the first support module, the second handle body, the second support module, the third clamping member and the fourth clamping member of the second support module.

Therefore, by virtue of the game controller provided by the present disclosure including a first support module and a second support module that are respectively disposed on the first handle body and the second handle body, the mobile device disposed between the first handle body and the second handle body can be effectively supported. In addition, the first clamping member and the second clamping member of the first support module, and the third clamping member and the fourth clamping member of the second support module can stably support a larger mobile device, such as a tablet computer. Therefore, the mobile device can be stably supported between the first handle body, the second handle body, the first support module, the second support module, the first clamping member and the second clamping member of the first support module, and the third clamping member and the fourth clamping member of the second support module.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
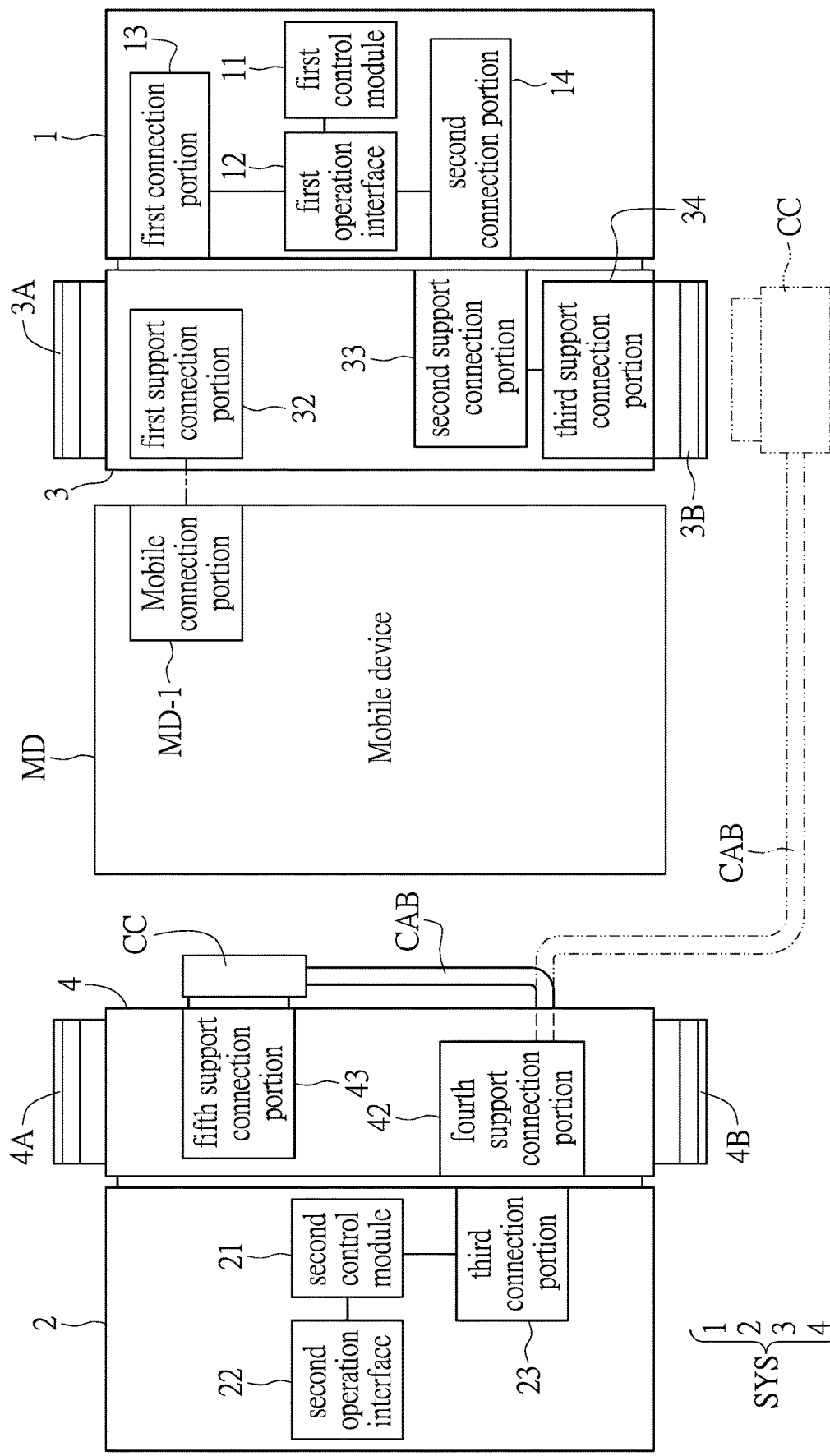
FIG. 1 is a functional block diagram of a game controller with a mobile device according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

Figure 2:
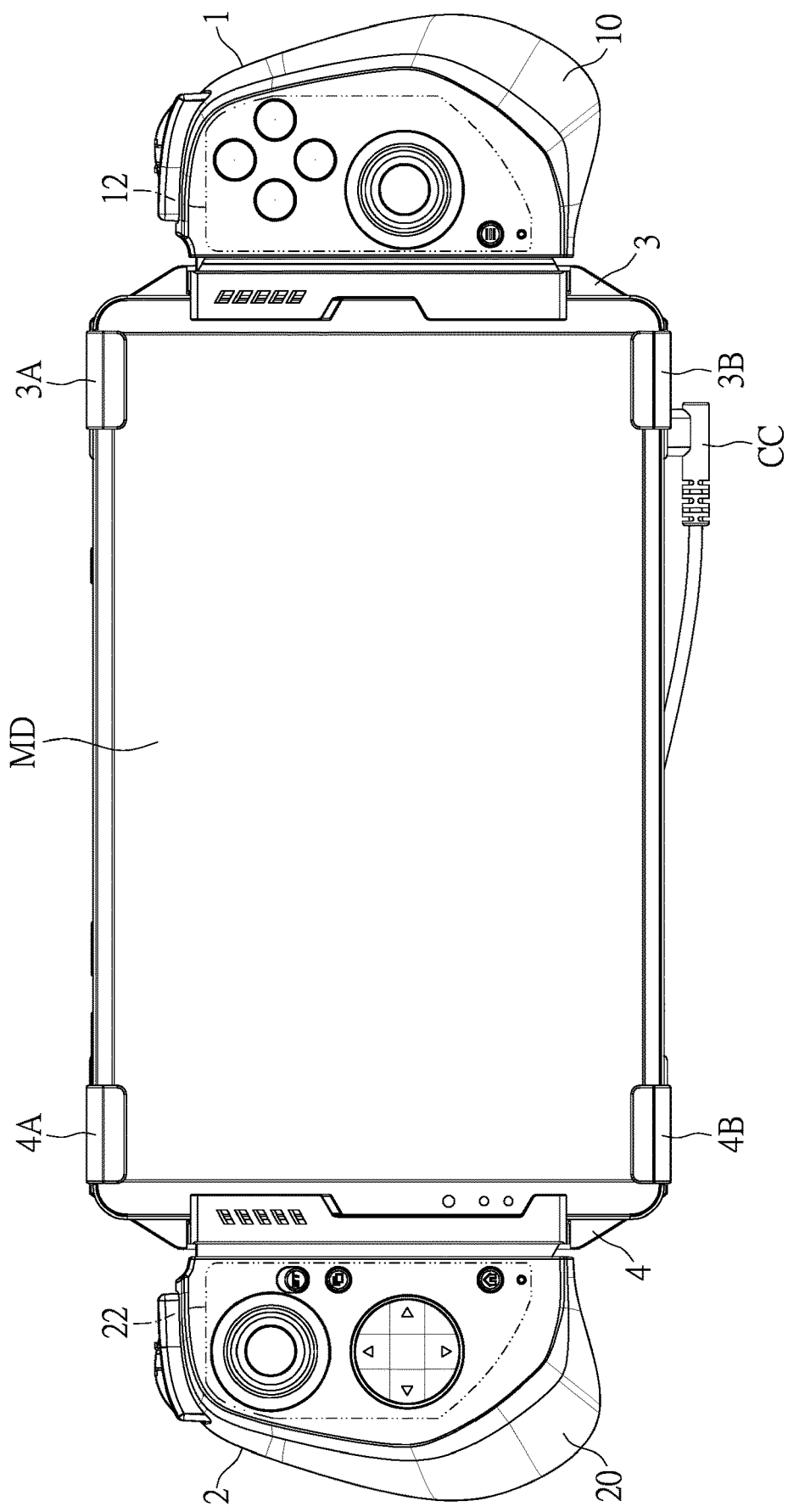
FIG. 2 is a schematic diagram of the game controller with the mobile device according to the first embodiment of the present disclosure.
Figure 3:
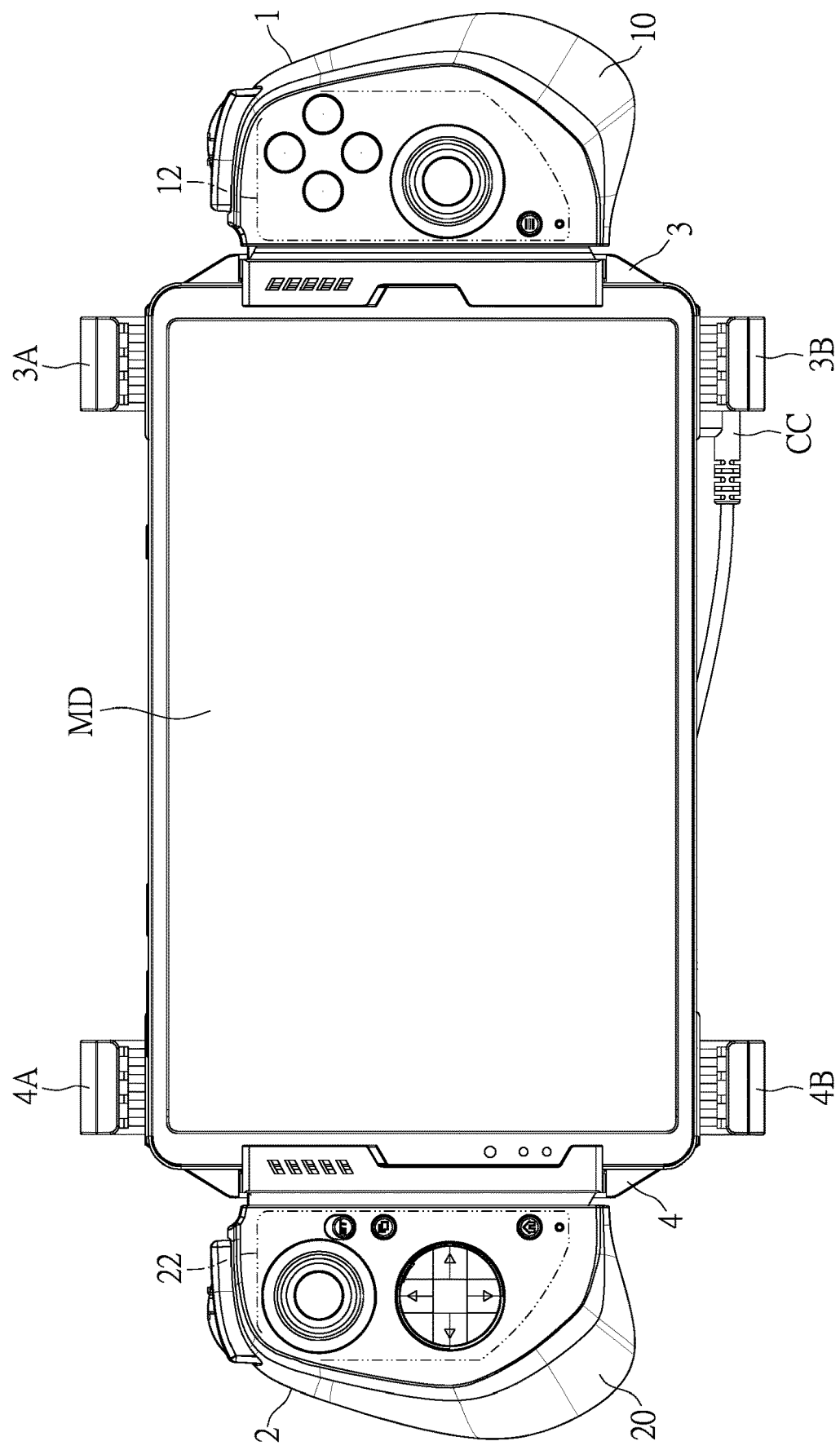
FIG. 3 is another schematic diagram of the game controller with the mobile device according to the first embodiment of the present disclosure.
Figure 4:
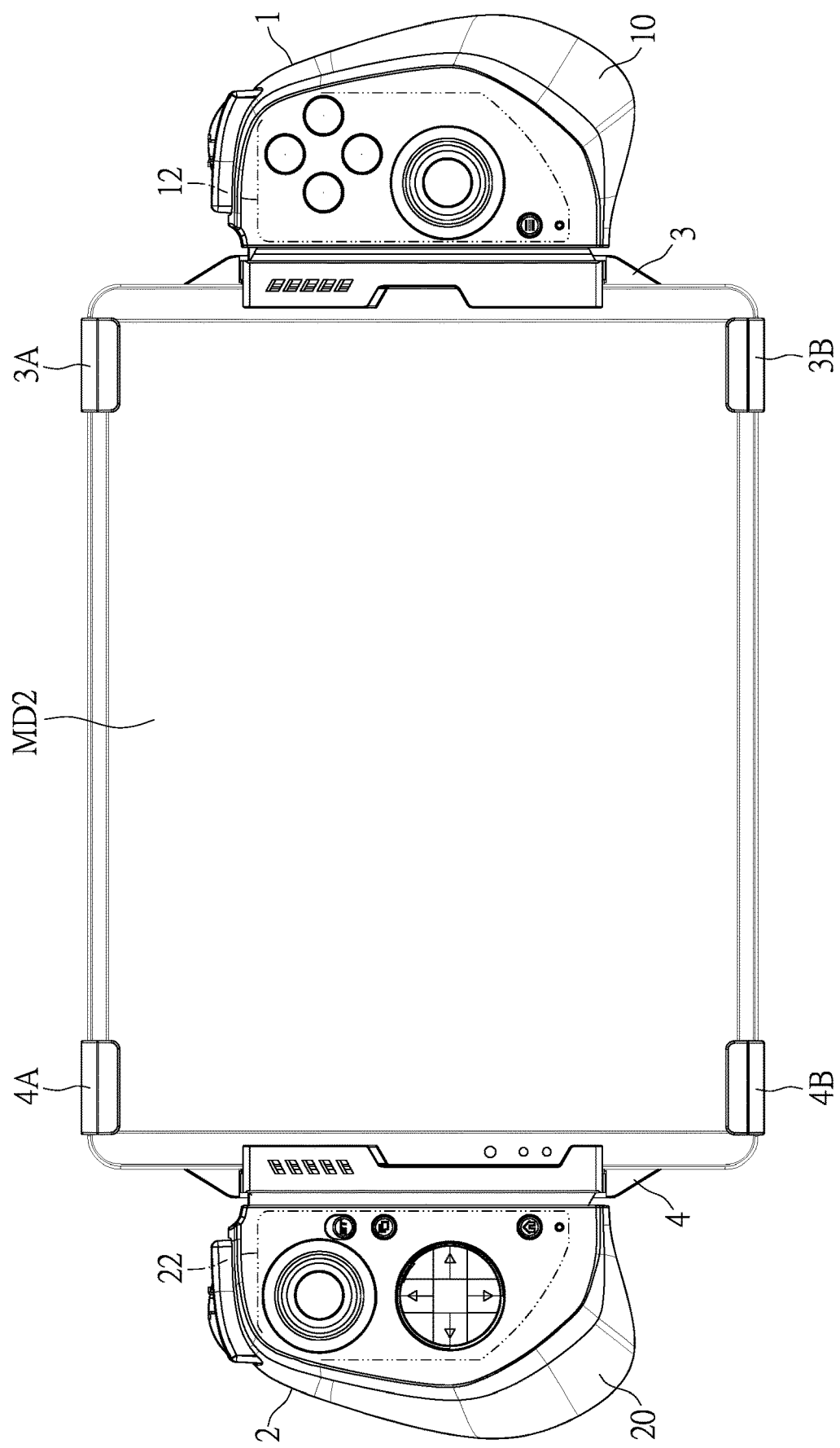
FIG. 4 is a functional block diagram of the game controller with a tablet computer according to the first embodiment of the present disclosure.
Figure 5:
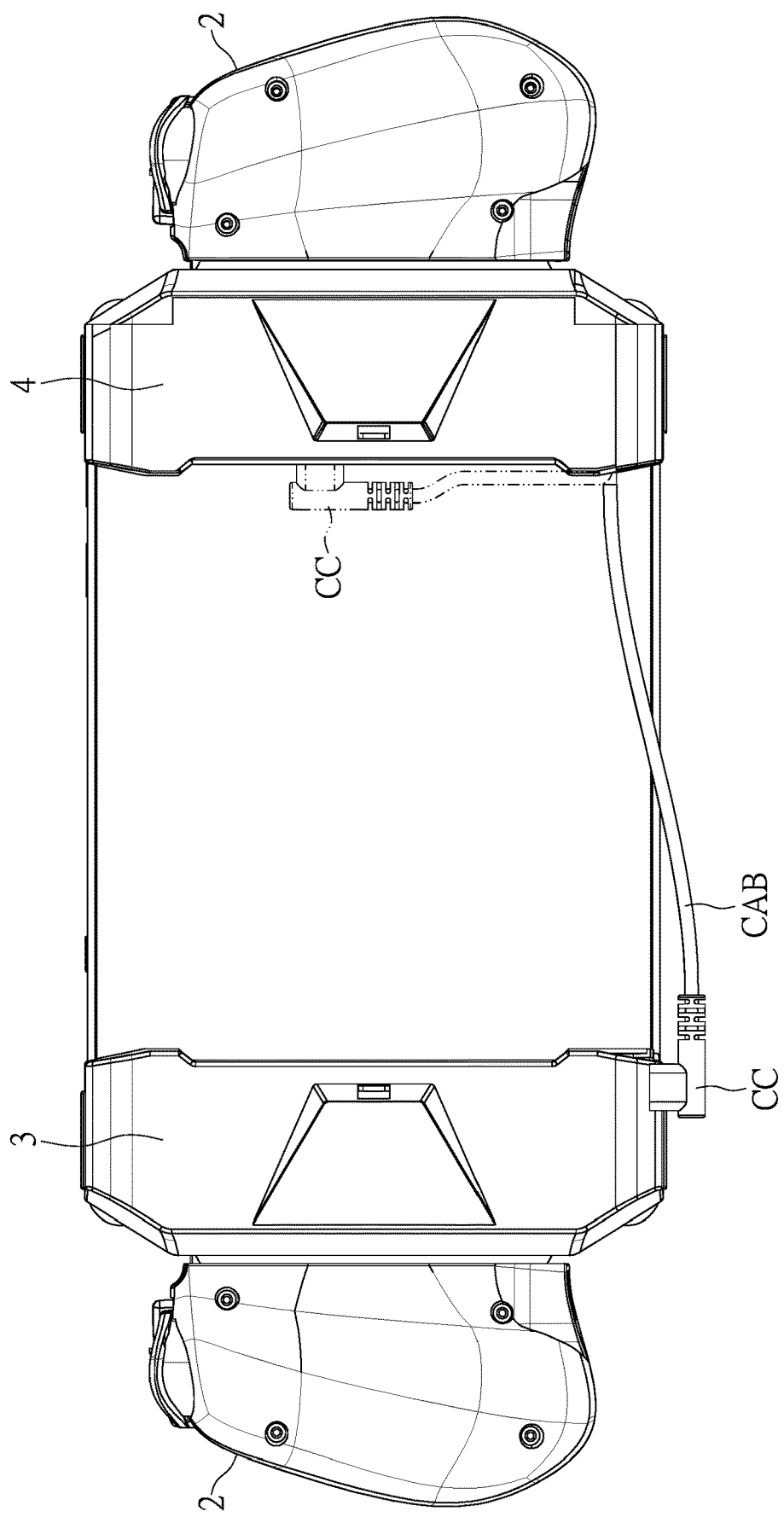
FIG. 5 is a schematic rear view of the game controller with the mobile device according to the first embodiment of the present disclosure.
Figure 6:
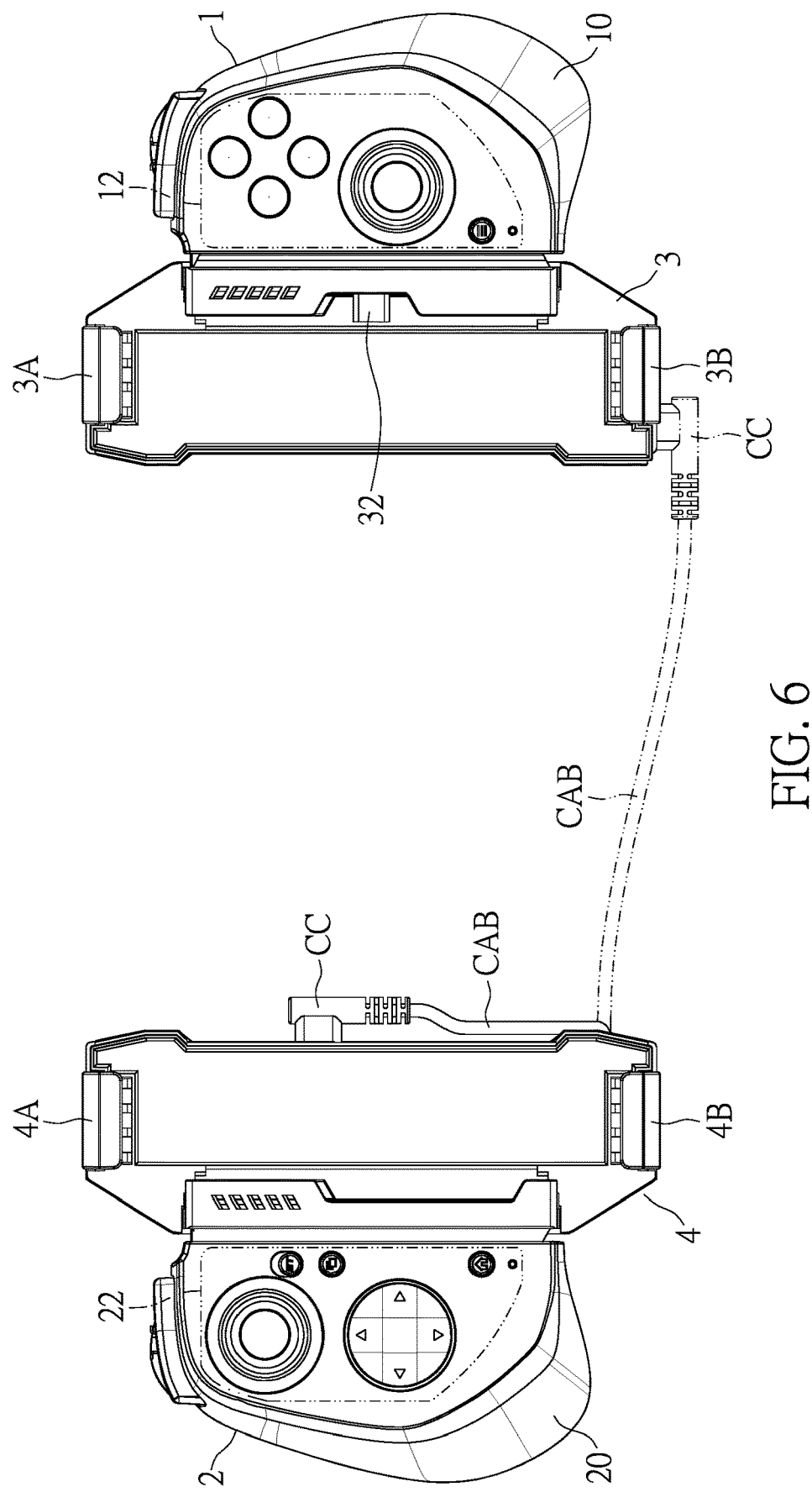
FIG. 6 is a schematic view of the game controller according to the first embodiment of the present disclosure.
Figure 7:
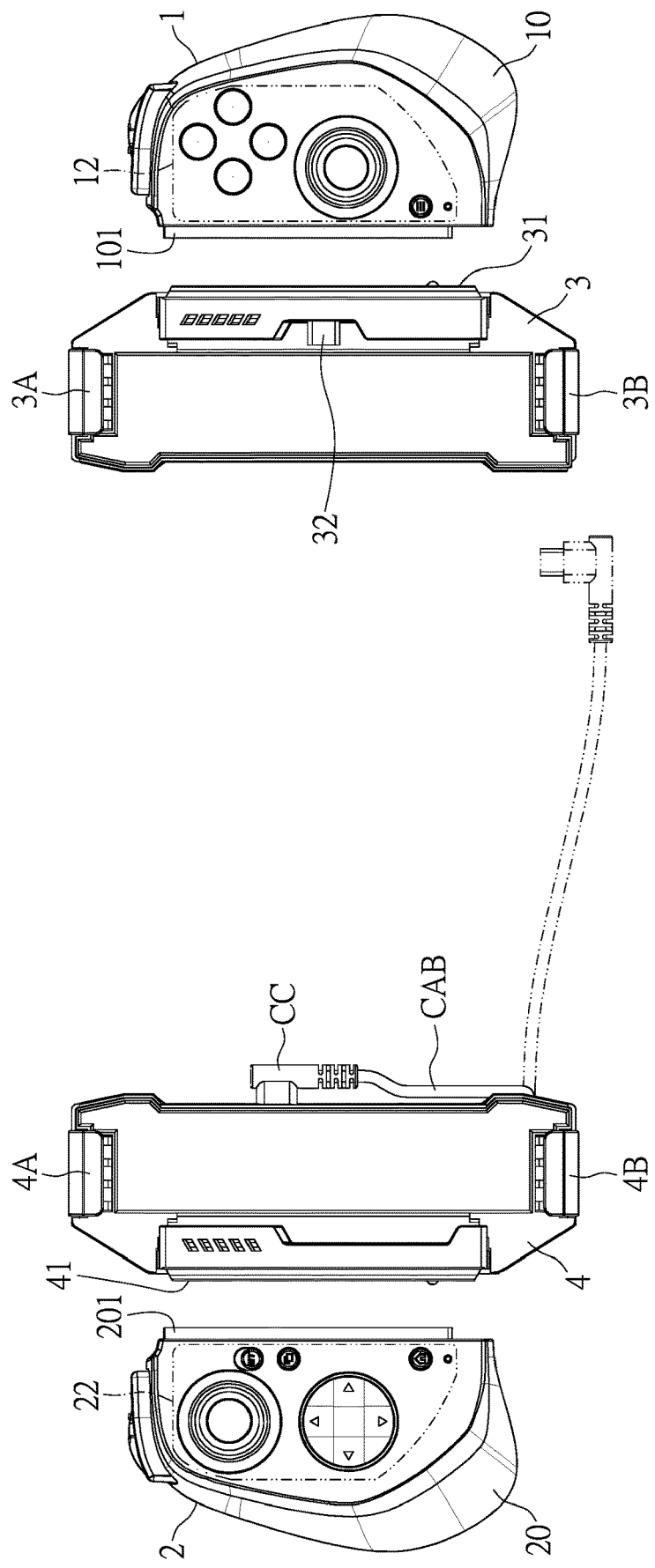
FIG. 7 is another schematic view of the game controller according to the first embodiment of the present disclosure.

Reference is made to FIG. 1, FIG. 2, FIG. 3, FIG. 4, FIG. 5, FIG. 6, and FIG. 7. FIG. 1 is a functional block diagram of a game controller with a mobile device according to a first embodiment of the present disclosure. FIG. 2 is a schematic diagram of the game controller with the mobile device according to the first embodiment of the present disclosure. FIG. 3 is another schematic diagram of the game controller with the mobile device according to the first embodiment of the present disclosure. FIG. 4 is a functional block diagram of the game controller with a tablet computer according to the first embodiment of the present disclosure. FIG. 5 is a schematic rear view of the game controller with the mobile device according to the first embodiment of the present disclosure. FIG. 6 is a schematic view of the game controller according to the first embodiment of the present disclosure. FIG. 7 is another schematic view of the game controller according to the first embodiment of the present disclosure.

Reference is made to FIG. 1, FIG. 2, and FIG. 3, in this embodiment, a game controller SYS is provided. The game controller SYS includes a first handle body 1, a second handle body 2, a first support module 3, and a second support module 4. A mobile device MD is disposed between the first support module 3 and the second support module 4.

The first handle body 1 is fixedly connected to the first support module 3. The second handle body 2 is fixedly connected to the second support module 4.

The first handle body 1, the second handle body 2, and the first support module 3 jointly supports the mobile device MD, so that the user can conveniently grasp the mobile device and use the mobile device over extended periods of time.

The first handle body 1 includes a first control module 11, a first operation interface 12, a first connection portion 13, a second connection portion 14, and a first casing 10.

The first operation interface 12 is electronically connected to the first control module 11. The first connection portion 13 is electrically connected to the first operation interface 12. The second connection portion 14 is electrically connected to the first control module 11.

With reference to FIG. 6, the first control module 11 is disposed in the first casing 10. The first operation interface 12 is disposed at a first side of the first casing 10. The first connection portion 13 is disposed at a second side of the first casing 10. The first casing 10 has a first handle groove 101 formed at the second side of the first casing 10. The first connection portion 13 is disposed in the first handle groove 101.

The first support module 3 includes a first support groove 31, a first support connection portion 32, a second support connection portion 33, and a third support connection portion 34.

The first support module 3 is engaged to the first handle groove 101 of the first casing 10 via the first support groove 31. The first support connection portion 32 is electrically connected to the first connection portion 13. The first support connection portion 32 is electrically connected to the second support connection portion 33. The first support connection portion 33 is configured to be connected to a mobile connection portion MD-1 of the mobile device MD.

The first support module 3 further includes a first clamping member 3A and a second clamping member 3B.

The first clamping member 3A is disposed at one side of the first support module 3. The second clamping member 3B is disposed at another side of the first support module 3. The second clamping member 3B and the first clamping member 3A are oppositely disposed. That is, the first clamping member 3A and the second clamping member 3B are disposed at two opposite sides of the first support module 3 to fixedly clamp the mobile device MD.

The second handle body 2 includes a second control module 21, a second operation interface 22, a second casing 20, and a third connection portion 23.

The second operation interface 22 is electrically connected to the second control module 21.

The second control module 21 is disposed in the second casing 20. The second operation interface 22 is disposed at a first side of the second casing 20. The second casing 20 has a second handle groove 201. The second handle groove 201 is formed at a second side of the second casing 20. The third connection portion 23 is disposed at one side of the second casing 20.

The second support module 4 includes a second support groove 41, a third clamping member 4A, and a fourth clamping member 4B.

The second support module 4 is engaged to the second handle groove 201 of the second casing 20 via the second support groove 41.

The third clamping member 4A is disposed at one side of the second support module 4.

The fourth clamping member 4B is disposed at another side of the second support module 4. The third clamping member 4A and the fourth clamping member 4B are oppositely disposed.

Referring to FIG. 2 and FIG. 3, the mobile device MD is disposed between the first support module 3 and the second support module 4. The first clamping member 3A and the second clamping member 3B are extendably disposed in the first support module 3. The third clamping member 4A and the fourth clamping member 4B are extendably disposed in the second support module 4.

Furthermore, the first clamping member 3A, the second clamping member 3B, the third clamping member 4A, and the fourth clamping member 4B are configured to clamp the mobile device MD, such that the mobile device MD is fixedly disposed between the first support module 3 and the second support module 4.

In other words, the first clamping member 3A, the second clamping member 3B, the third clamping member 4A, and the fourth clamping member 4B are capable of clamping two opposite sides of the mobile device MD, so that the mobile device MD is fixedly disposed between the first support module 3 and the second support module 4.

Referring to FIG. 4, a tablet computer having larger size can be disposed between an extended first clamping member 3A and an extended second clamping member 3B of the first support module 3, and an extended third clamping member 4A and an extended fourth clamping member 4B of the second support module 4.

Referring to FIG. 5, FIG. 6, and FIG. 7, a connection cable CAB is disposed in the second support module 4. The connection cable CAB includes a first terminal and a second terminal.

A fourth support connection portion 42 is connected to the third connection portion 23 of the second handle body 2.

The second terminal of the connection cable CAB includes a first cable connector CC. When the game controller SYS is in storage, or when the first handle body 1 and the second handle body 2 are used independently, the first cable connector CC is received in a fifth support connection portion 43 of the second support module 4. In this embodiment, the fifth support connection portion 43 can be an accommodation space or a connector.

When the first handle body 1 is connected to the second handle body 2, the first cable connector CC is electrically connected to the third support connection portion 34 of the first support module 3.

The connection cable CAB enables the first control module 11 and the second control module 21 to perform signal transmission. That is, the first control module 11 and the second control module 21 can transmit signals through the first support module 3, the second support module 4, and the connection cable CAB. Control signals of the first control module 11 and the first operation interface 12 can be transmitted to the second control module 21 of the second handle body 2 through the connection cable CAB for processing.

Similarly, control signals of the second control module 21 and the second operation interface 22 can also be transmitted to the first control module 11 of the first handle body 1 through the connection cable CAB for processing.

In other embodiments, the first handle body 1 and the second handle body 2 can respectively include a wireless communication circuit (not shown in the drawings), and perform data transmission with each other by using the wireless communication circuits (not shown in the drawings).

In other embodiments, the connection cable CAB can be disposed in the first support module 3, so as to be connected to a corresponding connection portion of the second support module 4.

The first control module 11 and the second control module 21 can each be a CPU, an ASIC, a GPU, or an MCU.

Figure 8:
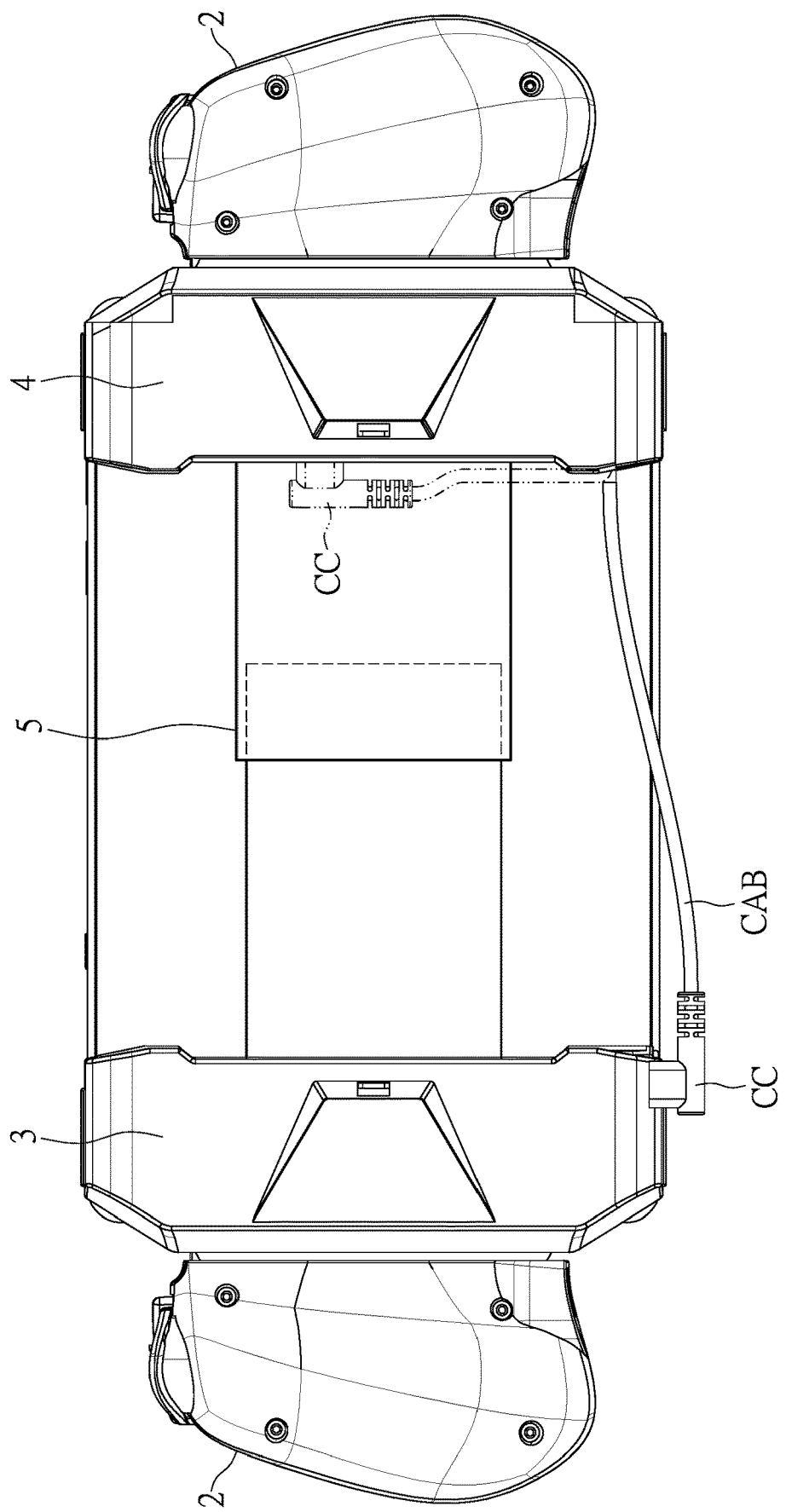
FIG. 8 is a schematic view of a game controller according to a second embodiment of the present disclosure.

Referring to FIG. 8, in other embodiments, the game controller SYS further includes a third support module 5 that is disposed between the first support module 3 and the second support module 4, and is connected to the first support module 3 and the second support module 4 to jointly support the mobile device MD.

In this embodiment, the first support connection portion 13, the third support connection portion 34, the mobile connection portion MD-1 and the first cable connector CC can be USB connectors, LIGHTNING® connectors, or HDMI® connectors.

The first connection portion 13, the second connection portion 14, the second support connection portion 33, and the fourth support connection portion 42 can be a plurality of electrically conductive contact areas disposed in grooves.

Figure 9:
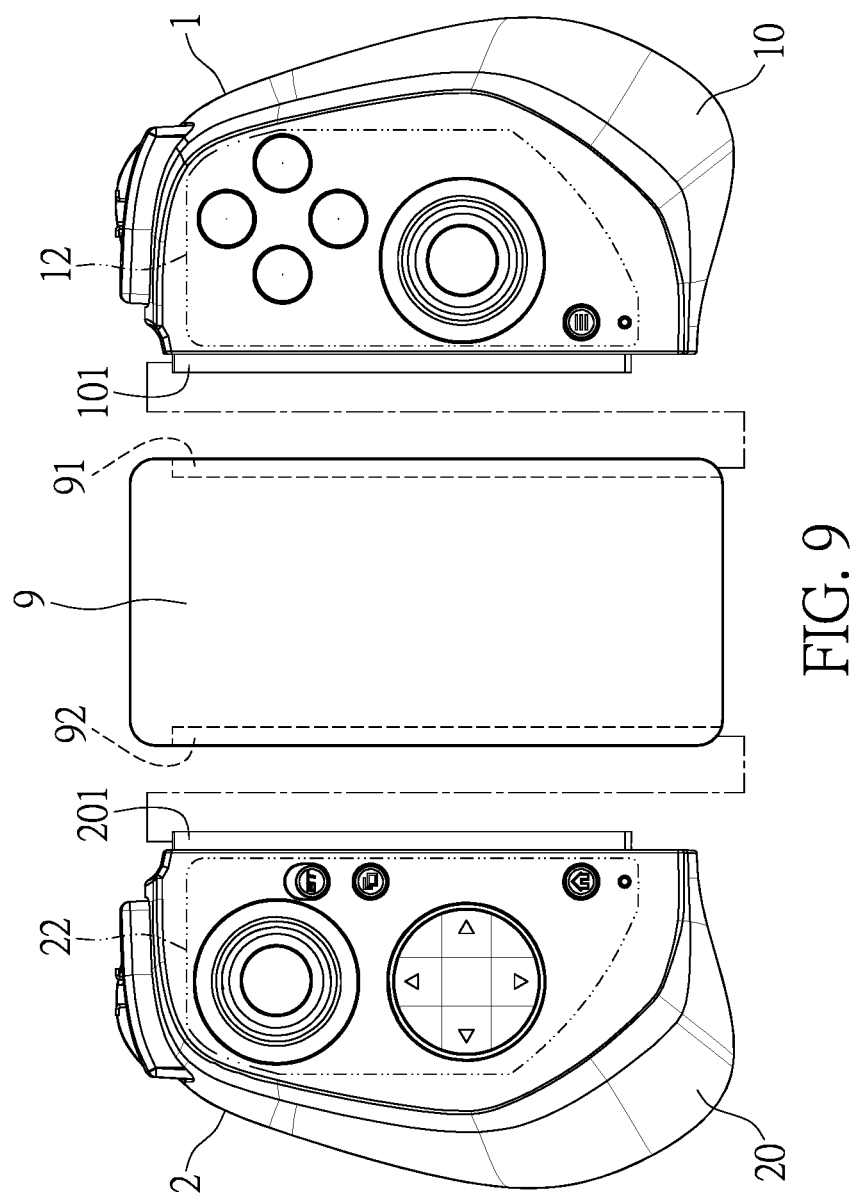
FIG. 9 is a schematic view of a game controller according to a third embodiment of the present disclosure.

Referring to FIG. 9, in other embodiments, the first handle body 1 and the second handle body 2 can also be connected to each other through an expansion element 9 for remotely controlling the mobile device MD. The expansion element 9 can be a communication device, an identity verification device, a remote control device, or a function expansion device, and is not limited in the present disclosure. The expansion element 9 has a first expansion groove 91 and a second expansion groove 92. The first expansion groove 91 of the expansion element 9 can be engaged with the first handle groove 101 of the first handle body 1. The second expansion groove 92 of the expansion element 9 can be engaged with the second handle groove 201 of the second handle body 2.

Beneficial Effects of the Embodiment

In conclusion, the game controller provided by the present disclosure includes a first support module and a second support module that are respectively arranged on the first handle body and the second handle body, so as to effectively support the mobile device disposed between the first handle body and the second handle body. Furthermore, the first clamping member and the second clamping member of the first support module, and the third clamping member and the fourth clamping member of the second support module can stably support a larger mobile device, such as a tablet computer. Therefore, the mobile device can be stably supported between the first handle body, the second handle body, the first support module, the second support module, the first clamping member and the second clamping member of the first support module, and the third clamping member and the fourth clamping member of the second support module.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A game controller, comprising:
   a first handle body including:
      a first control module;
      a first operation interface being electrically connected to the first control module;
      a first connection portion being electrically connected to the first operation interface;
      a second connection portion being electrically connected to the first control module; and
      a first casing, wherein the first control module is disposed in the first casing, the first operation interface is disposed at a first side of the first casing, and the first connection portion is disposed at a second side of the first casing, and wherein the first casing has a first handle groove formed at the second side of the first casing, and the first connection portion is disposed in the first handle groove;
   a first support module including:
      a first support groove;
      a first support connection portion;
      a second support connection portion, wherein the first support module is engaged to the first handle groove of the first casing via the first support groove, the first support connection portion is electrically connected to the first connection portion, the first support connection portion is electrically connected to the second support connection portion through the first operation interface, and the second support connection portion is configured to be connected to a mobile device;
      a third support connection portion being connected to the second support connection portion;
      a first clamping member being disposed at one side of the first support module; and
      a second clamping member being disposed at another side of the first support module, wherein the second clamping member and the first clamping member are disposed opposite to each other; and
   a second handle body including:
      a second control module;
      a second operation interface being electrically connected to the second control module; and
      a second casing, wherein the second control module is disposed in the second casing, the second operation interface is disposed at a first side of the second casing, and the second casing has a second handle groove formed at a second side of the second casing; and
   a second support module including:
      a second support groove, wherein the second support module is engaged to the second handle groove of the second casing via the second support groove;
      a fourth support connection portion, wherein, when the second support module and the second casing are engaged to each other, the fourth support connection portion is electrically connected to a third connection portion;
      a third clamping member being disposed at one side of the second support module; and
      a fourth clamping member being disposed at another side of the second support module, wherein the third clamping member and the fourth clamping member are disposed opposite to each other.

2. The game controller according to claim 1, wherein the mobile device is disposed between the first support module and the second support module.

3. The game controller according to claim 1, wherein the mobile device is disposed between the first support module, the second support module, the first clamping member, the second clamping member, the third clamping member, and the fourth clamping member.

4. The game controller according to claim 1, wherein the first clamping member and the second clamping member are extendably disposed in the first support module, and the third clamping member and the fourth clamping member are extendably disposed in the second support module.

5. The game controller according to claim 1, wherein a connection cable is disposed in the second support module, and the second support module further includes a fifth support connection portion, wherein the connection cable includes a first terminal and a second terminal, the second terminal of the connection cable includes a first cable connector, and the first terminal of the connection cable is connected to the fourth support connection portion, and wherein the first cable connector is configured to be connected to the third support connection portion of the first support module, and the first cable connector is received in the fifth support connection portion.

6. The game controller according to claim 5, wherein the first support connection portion, the third support connection portion, the mobile connection portion, and the first cable connector are USB connectors, LIGHTNING® connectors, or HDMI® connectors.

7. The game controller according to claim 5, wherein the first connection portion, the second connection portion, the second support connection portion, and the fourth support connection portion are a plurality of electrically conductive contact areas.

8. A game controller for supporting a mobile device, comprising:
   a first handle body having a first handle groove;
   a second handle body having a second handle groove;
   a first support module including:
      a first support groove, wherein the first support module is connected to the first handle groove of the first handle body through the first support groove;
      a first clamping member being extendably disposed in the first support module; and a second clamping member being extendably disposed in the first support module, wherein the first clamping member and the second clamping member are disposed at two opposite sides of the first support module; and
   a second support module including:
      a second support groove, wherein the second support module is connected to the second handle groove of the second handle body through the second support groove;
      a third clamping member being extendably disposed in the second support module; and
      a fourth clamping member being extendably disposed in the second support module, wherein the third clamping member and the fourth clamping member are disposed at two opposite sides of the second support module;
   wherein the mobile device is disposed between the first handle body, the first support module, the first clamping member and the second clamping member of the first support module, the second handle body, the second support module, and the third clamping member and the fourth clamping member of the second support module.

9. The game controller according to claim 8, wherein the first handle body includes a first operation interface, a first connection portion, and a second connection portion, wherein the first support module includes a first support connection portion, a second support connection portion, and a third support connection portion, wherein the first support connection portion is electrically connected to the first connection portion, and the first support connection portion is electrically connected to the second support connection portion through the first operation interface, and wherein the second support connection portion is configured to be connected to the mobile device, and the third support connection portion is connected to the second support connection portion;
   wherein the second handle body includes a third connection portion, the second support module includes a fourth support connection portion, and the third connection portion is connected to the fourth support connection portion.

10. The game controller according to claim 9, wherein the second support module further includes a fifth support connection portion, and a connection cable is disposed in the second support module, wherein the connection cable includes a first terminal and a second terminal, the second terminal of the connection cable includes a first cable connector, and the first terminal of the connection cable is connected to the fourth support connection portion, and wherein the first cable connector is connected to the third support connection portion of the first support module, and the first cable connector is received in the fifth support connection portion.

* * * * *